United States Patent
Kubo

(10) Patent No.: US 9,276,763 B2
(45) Date of Patent: Mar. 1, 2016

(54) INTERMITTENTLY OPERABLE COMMUNICATION APPARATUS WITH DIFFERENT CARRIER SENSE LEVELS SWITCHED BETWEEN TRANSMISSION AND RECEPTION AND METHOD THEREFOR

(75) Inventor: Yuki Kubo, Osaka (JP)

(73) Assignee: OKI ELECTRIC INDUSTRY CO., LTD., Tokyo (JP)

( * ) Notice: Subject to any disclaimer, the term of this patent is extended or adjusted under 35 U.S.C. 154(b) by 145 days.

(21) Appl. No.: 12/457,016

(22) Filed: May 29, 2009

(65) Prior Publication Data

US 2009/0296730 A1 Dec. 3, 2009

(30) Foreign Application Priority Data

May 30, 2008 (JP) ................................. 2008-143080

(51) Int. Cl.
  *H04L 12/413* (2006.01)
  *H04W 52/02* (2009.01)
  *H04L 1/00* (2006.01)

(52) U.S. Cl.
  CPC ............ *H04L 12/413* (2013.01); *H04L 1/0045* (2013.01); *H04W 52/0225* (2013.01)

(58) Field of Classification Search
  USPC .......... 370/311, 338, 445, 252; 375/222, 221; 358/1.14; 340/10.3, 10.2; 709/223; 455/522, 343.4, 343.2, 550.1
  See application file for complete search history.

(56) References Cited

U.S. PATENT DOCUMENTS

| | | | | |
|---|---|---|---|---|
| 5,572,546 | A | * | 11/1996 | Serfaty et al. .................. 375/221 |
| 6,157,616 | A | * | 12/2000 | Whitehead ..................... 370/252 |
| 2002/0131484 | A1 | * | 9/2002 | Diepstraten et al. .......... 375/222 |
| 2003/0036404 | A1 | * | 2/2003 | Adachi et al. ................. 455/522 |
| 2005/0025106 | A1 | * | 2/2005 | Seo et al. ....................... 370/338 |

(Continued)

FOREIGN PATENT DOCUMENTS

| | | |
|---|---|---|
| JP | 2006-005812 A | 1/2006 |
| JP | 2008042383 A | 2/2008 |
| JP | 2008-079045 A | 4/2008 |

OTHER PUBLICATIONS

Yi et al , Power Efficient Rendez-vous Schemes for dense wireless sensor networks, 2004.*

(Continued)

*Primary Examiner* — Vincelas Louis
(74) *Attorney, Agent, or Firm* — Rabin & Berdo, P.C.

(57) ABSTRACT

The communication apparatus intermittently carries out receiving operation during a predetermined reception period. The apparatus includes a wireless communication section for carrying out wireless communication, which includes a carrier sensor for sensing a carrier at the beginning of the communication, and a carrier sense switching section for using carrier sense levels different between packet transmission and reception to switch the carrier sense level of the carrier sensor according to the packet. Thus, the apparatus can use and flexibly adjust the optimum carrier sense level for the intermittent receiving operation within the reception period.

11 Claims, 4 Drawing Sheets

(56) References Cited

U.S. PATENT DOCUMENTS

| | | | |
|---|---|---|---|
| 2005/0058151 A1* | 3/2005 | Yeh | 370/445 |
| 2005/0136882 A1* | 6/2005 | Boulton | 455/343.4 |
| 2006/0003798 A1* | 1/2006 | Mizukami | 455/550.1 |
| 2006/0055958 A1* | 3/2006 | Kim et al. | 358/1.14 |
| 2007/0014268 A1* | 1/2007 | Kim et al. | 370/338 |
| 2007/0214247 A1* | 9/2007 | Yang et al. | 709/223 |
| 2007/0264963 A1* | 11/2007 | Srinivasan et al. | 455/343.2 |
| 2008/0095089 A1 | 4/2008 | Nishiyama et al. | |
| 2009/0021353 A1* | 1/2009 | Nonaka | 340/10.2 |
| 2009/0109885 A1* | 4/2009 | Fonseca et al. | 370/311 |
| 2010/0020711 A1* | 1/2010 | Horisaki et al. | 370/252 |
| 2010/0027449 A1* | 2/2010 | Kim et al. | 370/311 |
| 2010/0085161 A1* | 4/2010 | Nishikawa | 340/10.3 |

OTHER PUBLICATIONS

En-Yi A. Lin et al., "Power-Efficient Rendez-vous Schemes for Dense Wireless Sensor Networks", Proceedings of ICC (IEEE International Conference on Communications) 2004, Paris, France, Jun. 2004.

Foreign Office Action issued on Aug. 6, 2013 with English translation.

* cited by examiner

INTERMITTENTLY OPERABLE COMMUNICATION APPARATUS WITH DIFFERENT CARRIER SENSE LEVELS SWITCHED BETWEEN TRANSMISSION AND RECEPTION AND METHOD THEREFOR

BACKGROUND OF THE INVENTION

1. Field of the Invention

The present invention relates to a communication apparatus and a communication method, and more particularly a communication apparatus and a communication method applicable to, for example, a telecommunications network system, such as a sensor network, including many wireless communication nodes distributed in an area to achieve mutual data communication between the nodes on wireless signals.

2. Description of the Background Art

Specifically in communication nodes forming a telecommunications network, such as a sensor network, the saving of power consumption is demanded. En-Yi A. Lin, et al., "Power-Efficient Rendez-vous Schemes for Dense Wireless Sensor Networks", Proceedings of ICC (IEEE International Conference on Communications) 2004, Paris, France, June 2004, discloses a solution in which a wireless device performs an intermittent startup operation.

According to the communication technique taught by En-Yi A. Lin, et al., the wireless device is powered on in a short period of time at a predetermined time interval for waiting for signal reception and powered off in the remaining period of time, thereby saving the power consumption. This periodic timing for waiting is called "sniff timing".

When a transmitter node intends to transmit a data packet to a receiver node, the transmitter node is required to transmit the packet in time with the sniff timing of the receiver node. However, it is generally difficult to know the sniff timing of other nodes such as the receiver node.

In the prior art solution, if traffic arises, the transmitter node successively sends startup request packets. This makes it possible to deliver a startup request packet in course of time to the receiver node, or destination, within its sniff timing. In response, the receiver node transmits a startup response packet to the transmitter node, or source. The source node is thus notified of the destination node now being in its reception waiting state, and then transmits data packets in correct timing.

The a communication technique taught by En-Yi A. Lin, et al., is called "power-saving listening scheme", and is implemented in a remarkably simple manner and may accomplish excellent power-saving effect.

The power-saving of the intermittent operation of communication technique becomes more effective by setting the period of time assigned for signal reception waiting in the sniff timing as short as possible. Instead, if the time for signal reception waiting is made too short, it is then possible for a destination node to receive only part of the startup request transmitted from another node, thus failing to correctly receive the startup request packet. In this case, the startup request packet has been received not entirely but partially, thus exhibiting the high level in received signal strength.

The nature of the high received signal strength can be utilized for solving the above-mentioned problem. That is, the default value of the time for signal reception waiting is set shorter, and carrier sensing is continuously carried out during such a shorter waiting time. If the high level in received signal strength is continuously detected in the carrier sensing, then the signal reception waiting time is somewhat extended so as to entirely receive the startup request packet.

The manner stated above may utilize a reference or threshold level to determine whether the received signal strength is in the high or the low level. Such a reference level is called a "carrier sense level". The carrier sense level is a parameter also relating to the collision avoidance system, such as CSMA (Carrier Sense Multiple Access) system, for use in packet transmission. The value of the carrier sense level is generally selected in consideration that the packet transmission does not conflict with other systems.

The value of the carrier sense level is therefore selected suitably for preventing the collision by the CSMA system or the like. There is however another problem that the value is not necessarily suitable to determine in the power-saving listening scheme whether or not the startup request packet is being transmitted at the sniff timing from a neighboring node.

Furthermore, the suitable value of carrier sense level for determining whether or not a startup request packet is being transmitted from a neighboring node depends upon how the nodes are distributed and how radio waves propagates. Therefore, if the suitable value of the carrier sense level is selected in advance when designing a telecommunications system, it may be costly.

SUMMARY OF THE INVENTION

It is an object of the present invention to provide a communication apparatus and a communication method in which the most suitable carrier sense level for intermittent operation is utilized to intermittently carry out a periodic receiving operation of a predetermined period of time with the carrier sense level adjusted with flexibility.

In accordance with the present invention, a communication apparatus that intermittently carries out receiving operation during a predetermined reception period comprises a wireless communication section for carrying out wireless communication, which comprises a carrier sensor for sensing a carrier sense at the beginning of the communication, and a carrier sense switching section for setting in the carrier sensor a first carrier sense level of for use in packet transmission and a second carrier sense level for use in packet reception and different from the first sense level, the carrier sense switching section selectively switching the carrier sense levels according to a packet.

Further, in accordance with the present invention, a communication method in a communication apparatus that intermittently carries out receiving operation during a predetermined reception period and that includes a wireless communication section and a carrier sense switching section, the wireless communication section including a carrier sensor for sensing a carrier at the beginning of the communication, comprises a wireless communication step of carrying out wireless communication by the wireless communication section, and a carrier sense switching step of setting in the carrier sensor a first carrier sense level of for use in packet transmission and a second carrier sense level for use in packet reception and different from the first sense level, and selectively switching the carrier sense levels according to a packet.

Moreover, in accordance with the present invention, a communication program for controlling a computer to operate as a communication apparatus that intermittently carries out receiving operation during a predetermined reception period, wherein the apparatus including a wireless communication section including a carrier sensor for sensing a carrier at the beginning of the communication for carrying out wireless communication, and a carrier sense switching section for setting in the carrier sensor a first carrier sense level of for use in packet transmission and a second carrier sense level for use in packet reception and different from the first sense level, and selectively switching the carrier sense levels according to a packet.

According to the communication apparatus of the present invention, when intermittently carrying out periodic receiving operation during a predetermined period, it is possible to utilize the most suitable carrier sense level for the intermittent operation, and also to adjust the carrier sense level with flexibility.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
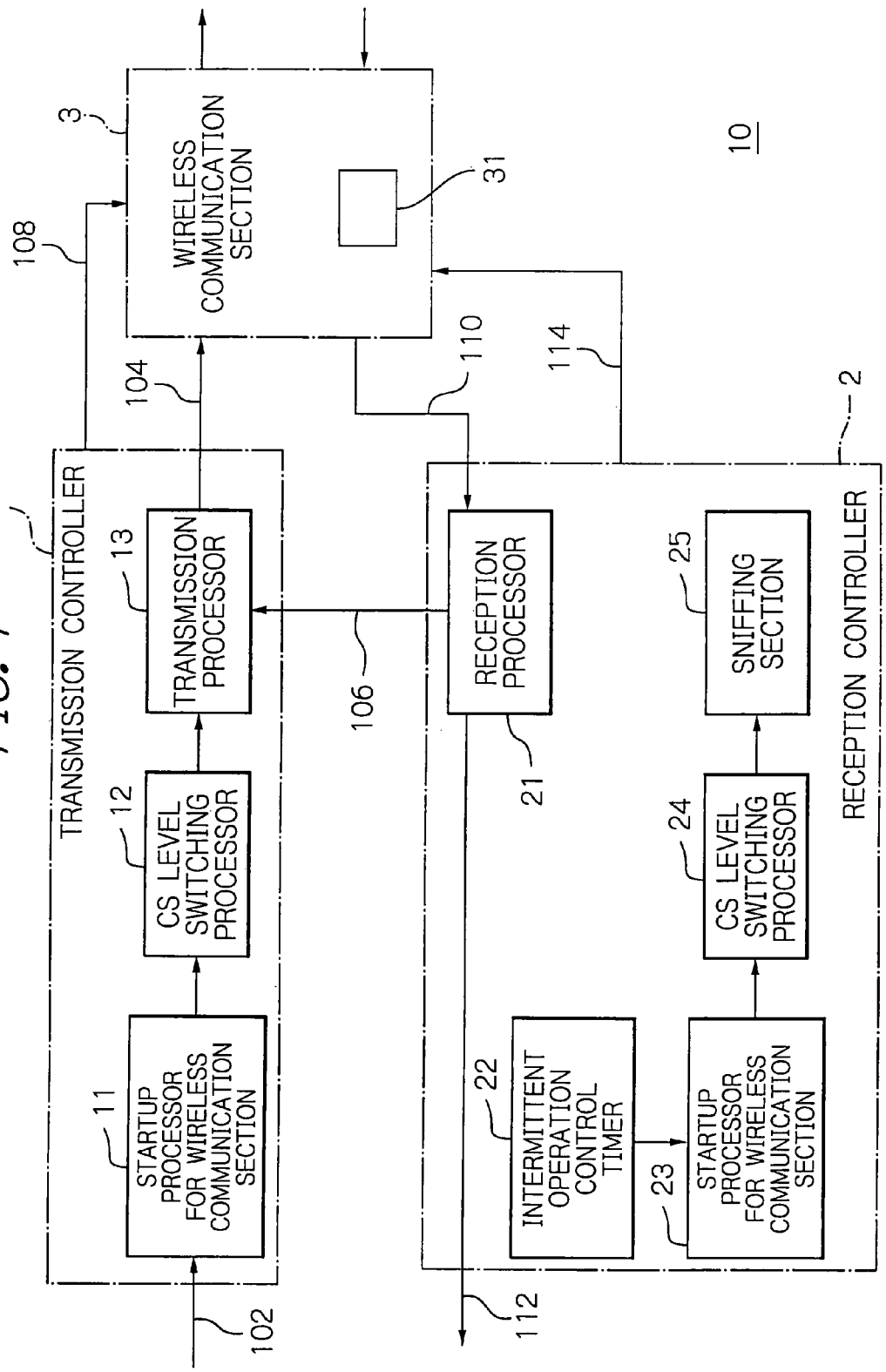
FIG. 1 is a schematic block diagram showing the internal structure of a preferred embodiment of a communication apparatus, i.e. node, in accordance with the present invention.

With reference to the accompanying drawings, a preferred embodiment of a communication apparatus according to the present invention will be described below. The preferred embodiment to be described is applied to a communication apparatus included in communication nodes which constitute, for example, a sensor network.

In the preferred embodiment, the sensor network is composed of many nodes distributed in its service area. Each node serves as transmitting and receiving information data to and from its neighboring nodes, thereby carrying out required communication to a destination node, such as a sink node.

Each node is also adapted for saving power consumption during wireless communication by an intermittent operation of periodically powering off, e.g. unused wireless devices with appropriate communication maintained.

Now, reference will be made to FIG. 1, which is a schematic block diagram showing the internal configuration of the communication apparatus installed in a node according to the preferred embodiment. As shown in the figure, the communication apparatus 10 of the preferred embodiment includes at least a transmission controller 1, a reception controller 2 and a wireless communication section 3, which are interconnected as illustrated.

The wireless communication section 3 is adapted to perform wireless packet communication on a wireless communication scheme applied to the telecommunications network system formed by the nodes. The wireless communication section 3 is controlled by the transmission controller 1 and the reception controller 2 to perform intermittent operation such that the communication section 3 may be turned on or off to shift itself from its sleep state to its startup, i.e. active state, or vice versa, respectively. Thus, the communication section 3 may suitably switch over to its active or sleep state, thereby accomplishing power-saving packet communication.

The wireless communication section 3 includes a carrier sensor 31. The wireless communication section 3 is thus broadly applicable to various communication systems, such as CSMA (Carrier Sense Multiple Access) system, in which at least a carrier is sensed prior to starting communication to determine whether or not its neighboring nodes are involved in communication.

The transmission controller 1 is adapted to control the transmission process of the wireless communication section 3. The transmission controller 1 is responsive to a send request of a packet 102 arrived to shift the communication section 3 to its startup or wakeup state and then control the transmission process according to the power-saving listening scheme. In the description, signals or data are designated with reference numerals on connections on which they are conveyed.

As a power-saving listening scheme, the technique taught by En-Yi A. Lin, et al., mentioned earlier may be applied to the communication apparatus 10. In the apparatus 10, a packet send request may be received, for example, when obtaining sensor information from a sensor, not shown, or forwarding information data sent from another node.

The transmission controller 1 includes as main functional processors a startup processor 11 for wireless communication section, a carrier sense (CS) level switching processor 12 and a transmission processor 13, which are interconnected as shown.

The startup processor 11 for wireless communication section is adapted to respond a packet send request received to shift the wireless communication section 3 to its startup, or active, state.

The CS level switching processor 12 is adapted to check the carrier sense level of the wireless communication section 3. When the result from the checking shows that the level does not reach a predetermined value for a transmission CS level when a packet 104 corresponding to the packet 102 is transmitted, the processor 12 causes the wireless communication section 3 to change the carrier sense level to the transmission CS level. In the context, the transmission CS level is set to the optimum value of the carrier sense level for preventing collision in the CSMA system.

Thus, by changing the carrier sense level of the wireless communication section 3 to the transmission CS level, it is possible to determine whether or not a carrier is sensed when the detected received signal strength is at least equal to or lower than the transmission CS level, respectively. Of course, when the carrier sense value equals the transmission CS level, the CS level switching processor 12 does not change the carrier sense level.

The transmission processor 13 is adapted to successively transmit startup request packets for waking up a destination node when a packet 104 is to be transmitted. The transmission processor 13 repeats the successive transmission of startup request packets until a startup response 106 is received in reply from the destination node. If a startup response 106 cannot be received within a predetermined period of time, then the transmission processor 13 may determine that the intended transmission has failed. Furthermore, the transmission data processor 13 is adapted to shift the wireless communication section 3 to its sleep state in case of the transmission failure or after completing data packet transmission through a reception of the startup response 106, i.e. in case of the transmission success.

The reception controller 2 is adapted to control the intermittent startup operation and the reception process of the wireless communication section 3. The reception controller 2 includes a reception processor 21, an intermittent operation control timer 22, a startup processor 23 for wireless communication section, a CS level switching processor 24 and a sniffing section 25, which are interconnected as depicted.

The reception processor 21 carries out the reception processing of a received packet 110 supplied from the wireless communication section 3 and detects its header information to thereby determine whether the received packet 110 is a control packet or an upper-layer process packet. If the received packet 110 is a startup response packet, the reception processor 21 informs the transmission processor 13 that the startup response packet has been received. Alternatively, if it is any upper-layer process packet, i.e. a packet to be processed by an upper-layer processing section, not shown, the reception processor 21 informs the upper-layer processing section of the receiving result 112.

The intermittent operation control timer 22 serves as controlling the timing of the intermittent operation of the wireless communication section 3. For example, when the communication section 3 is designed to be operative periodically at a time interval T seconds, the intermittent operation control timer 22 gives a timer signal to the startup processor 23 for wireless communication section at intervals T. The intermittent operation control timer 22 thus works as a trigger for directing the start of sniffing so that the wireless communication section 3 can wake up.

The startup processor 23 for wireless communication section is adapted to be responsive to a timer signal from the intermittent operation control timer 22 to shift the wireless communication section 3 to its startup state, i.e. active state. Thus, the apparatus 10 can be shifted to the state in which packets can be received.

The CS level switching processor 24 functions as checking the value of the carrier sense level held by the wireless communication section 3. If the value checked in the sniffing does not reach the CS level for sniffing, i.e. sniff CS level, the processor 24 changes the carrier sense level of the wireless communication section 3 to the sniff CS level.

In the context, the sniff CS level takes the value of a carrier sense level for use in determining whether or not the neighboring node is sending a startup request packet. It is preferable to set the value of the sniff CS level lower than the transmission CS level.

Therefore, the carrier sense carried out during the sniff timing period by the sniffing section 25, described below, makes it possible to detect a packet received, even when the received signal strength is weaker, and to extend the sniff timing period of the sniffing section 25 so as to complete the packet reception. However, if the value of the sniff CS level is set too low, then noise may cause the period of waiting for packet reception to unnecessarily be extended, thus causing wasteful power consumption. When the checked value reaches the sniff CS level, the CS level switching processor 24 does not change the carrier sense level held by the wireless communication section 3.

The sniffing section 25 is adapted to carry out carrier sense during the sniff timing period. In addition, if the sniffing section 25 detects that carriers have been received a predetermined number of times within the sniff timing period, then it determines that a packet 110 has partially been received with higher possibility so as to extend the sniff timing period accordingly. Therefore, the duration in which the wireless communication section 3 is powered on is extended correspondingly to the extended sniff timing period.

Now, the operation of the communication apparatus 10 serving as a node of the illustrative embodiment will be described with reference to FIGS. 1, 2 and 3 directed to an example of establishing a block synchronization during test operation.

Figure 2:
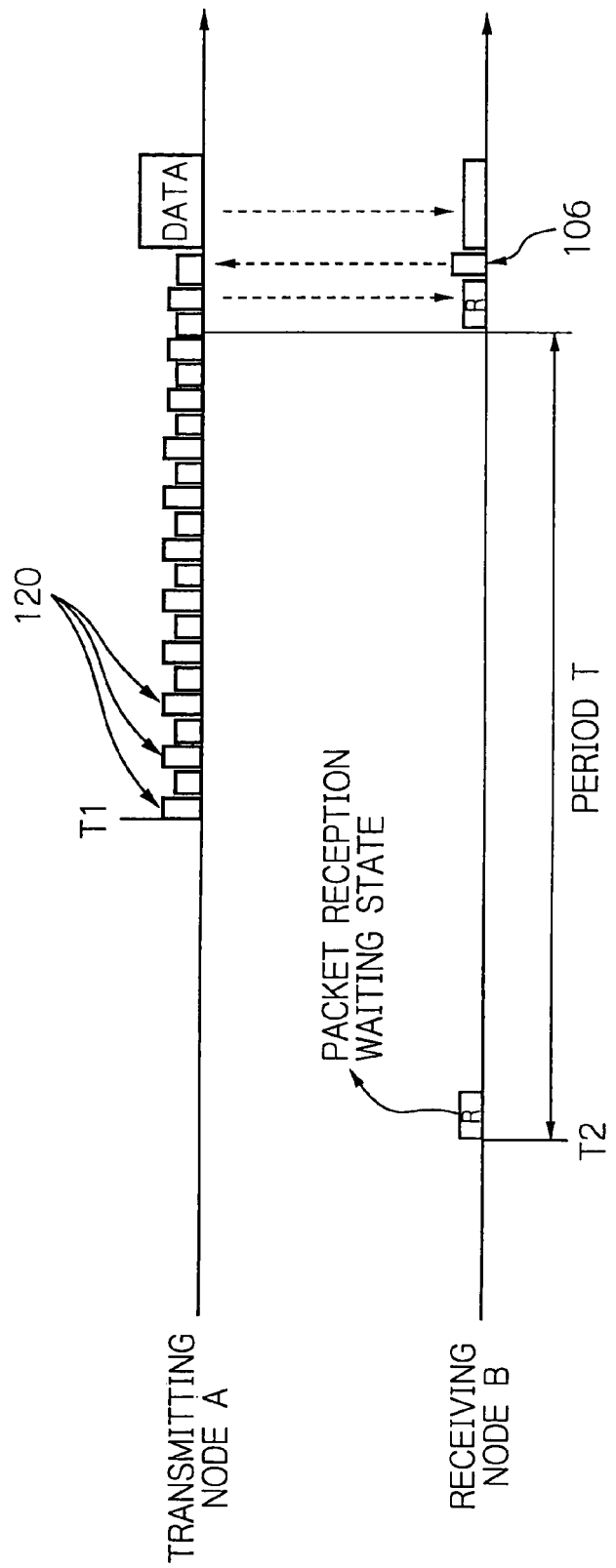
FIG. 2 is a timing chart useful for understanding the intermittent operation carried out between the nodes in the illustrative embodiment.
Figure 3:
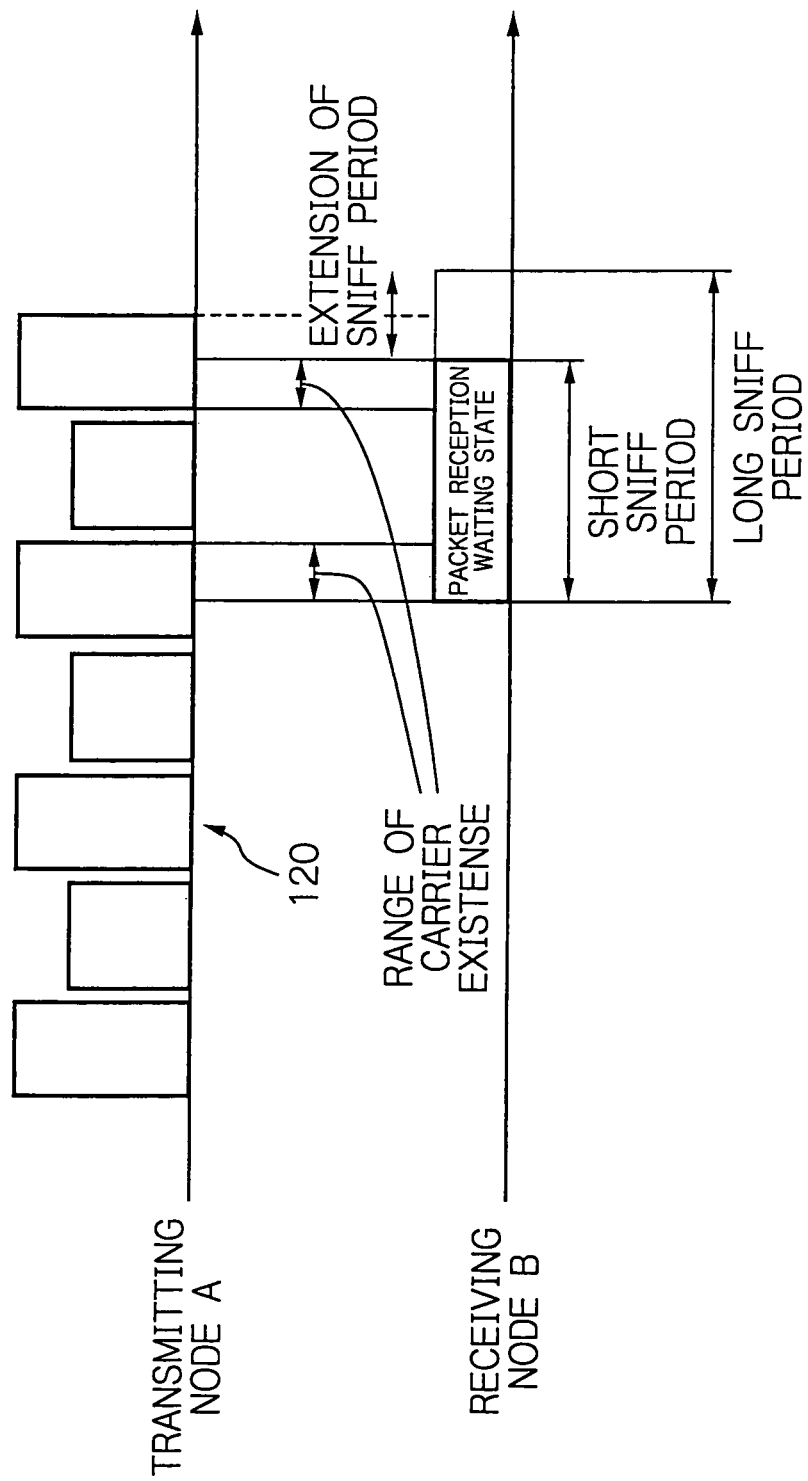
FIG. 3 is a timing chart useful for understanding how sniffing is carried out between the nodes in the embodiment.

In an example as shown in FIG. 2, nodes A and B are packet transmitter and receiver nodes, respectively. In advance, the CS level for sniffing, or sniff CS level stated above, is set lower in value than the CS level for transmission. For example, the transmission CS level of the nodes A and B is set to a value of −77 dBm, and the sniff CS level of the nodes A and B is set to a value of −85 dBm.

Prior to describing the operation of nodes A and B, the communication technique taught by En-Yi A. Lin, et al., stated earlier will be reviewed with reference to FIG. 2. The wireless devices or section in the nodes is powered on in a short period of time, i.e. sniff timing, at a predetermined time interval T for waiting for signal reception and powered off in the remaining period of time, thereby saving power consumption.

In the prior art, when a data packet is transmitted from the transmitter node A to the receiver node B, the transmitter node A has to transmit the packet in time with the sniff timing of the receiver node B. It is however generally difficult to know the sniff timing of another external node.

According to the conventional power-saving listening scheme taught by En-Yi A. Lin, et al., when traffic occurs, the transmitter node A successively sends startup request packets. It is thus possible to deliver in course of time the startup request packet to the receiver, i.e. destination, node B within the sniff timing of the node B. Then, the receiver node B transmits a startup response packet to the transmitter source node A. The source node A can thereby know that the destination node B is now in its reception waiting state and then transmit data packets in correct timing.

With the illustrative embodiment of the invention, initially, the wireless communication section 3 of the node A, i.e. transmitter node, is in its sleep state. Then, when traffic to the node B is generated at the node A at the timing T1, the startup processor 11 in the node A transfers an operational mode switching signal 108, FIG. 1, to the wireless communication section 3 to thereby shift the wireless communication section 3 to its startup state.

Moreover in the node A, the CS level switching processor 12 checks the value of the carrier sense level. If the checked value does not reach the transmission CS level, the carrier sense level is changed to the transmission CS level. It is therefore possible to use the optimum carrier sense level for CSMA system.

Thereafter, the transmission processor 13 of the node A sends successively startup request packets 120 addressed to the node B to the wireless communication section 3, which in turn successively transmits those startup request packets 120. It is thus possible to transmit the startup request packet according to the power-saving listening scheme.

Meanwhile, in the node B, i.e. receiver node, the wireless communication section 3 is controlled by the reception controller 2 to carry out intermittent startup operation.

Specifically, in the reception controller 2 of the node B, when the intermittent operation control timer 22 counts the period T, the startup processor 23 for wireless communication section transfers an operational mode switching signal 114 to the wireless communication section 3. In turn, after receiving the operational mode switching signal, the wireless communication section 3 is powered on to shift itself to its packet reception waiting state at the timing T2 so as to maintain the powered-on state only during the predetermined short sniff timing period. After the period has lapsed, the communication section 3 is powered off to shift itself to its sleep state again so that the apparatus 10 is shifted to the state in which no packets can be received.

Moreover in the node B, the CS level switching processor 24 checks the value of the carrier sense level. If the checked value does not reach the sniff CS level, the carrier sense level is changed to the sniff CS level.

After the carrier sense level is changed to the sniff CS level, the sniffing section 25 carries out sniffing during the predetermined short sniff timing period. Since the sniffing is thus carried out after changed to the sniff CS level, it is possible to receive a startup request packet from the node A.

The sniffing operation will now be described below. The sniffing section 25 continues the carrier sensing during the predetermined sniff timing period. For example, the sniffing section 25 may repeat the carrier sensing 200 times during a predetermined period. If the reception processor 21 is successful in receiving a startup request packet in this period, the reception processor 21 informs that reception to the transmission processor 13. In turn, the transmission processor 13 forwards the startup response, and the reception processor 21 shifts to the packet reception waiting state for data packets.

By contrast, in the node A, when the reception processor 21 receives the startup response, that reception is informed to the transmission processor 13. In this way, the node A may confirm that both of the nodes A and B have been in the active state thereof, and then the transmission processor 13 of the node A transmits data packets addressed to the node B.

In the node B, even when the carriers have been detected over a predetermined number of times during the sniff timing period, the sniffing section 25 may detect the existence of the carriers. In this case where the carriers are detected over the predetermined number of times, there is a high possibility of having received partially the startup request packet, so that the sniffing section 25 extends the sniff timing period.

In this case, if the sniff period of time is shortened, the time period required for maintaining the active state of the wireless communication section 3 is decreased, thus rendering it possible to enhance power-saving efficiency. However, if the sniff time period is too short, the possibility will be increased in which only part of startup request packets are received.

In order to avoid this tendency, the sniffing section 25 is adapted to extend, when the sniffing can bring the reception of a startup request packet, the sniff period until a following data packet is received. The sniffing section 25 then switches the wireless communication section 3 to its sleep state.

By contrast, if the sniffing section 25 is not successful in receiving the startup request packet, then it immediately switches the wireless communication section 3 to its sleep state.

Now, the CS level for transmission and the CS level for sniffing will be described below. While the node A successively transmits startup request packets, the wireless communication section 3 of the node A keeps its carrier sense level at the transmission CS level as described above. In this case, if the transmission CS level is set too low, the carrier sense according to the CSMA system in the wireless communication section 3 may react too sensitively, so that the opportunity for transmission from the node A may be decreased. As a result, the interval for successively transmitting startup request packets is extended so that the probability of failing to receive startup request packets at the node B might be increased. It is therefore preferable to select the transmission CS level as high as possible in consideration of laws or regulations on radio and radio interferences.

Conventionally, while the node B, i.e. receive node, carries out sniffing, the wireless communication section 3 of the node B keeps its carrier sense level at the sniff CS level. While sniffing, most of the wireless communication sections 3 bases upon the IEEE 802.15.4 standard can receive packets whose strength is about −90 dBm. Therefore, when the startup request packets of the node A have arrived at the node B with a strength of −80 dBm and can only partially be received as shown in FIG. 3, if the carrier sense level in the wireless communication section 3 of the node B reaches −77 dbm of the transmission CS level, then the node B would determine that no carrier exists. The node B then could not shift to the longer sniff operation, thus failing to receive startup request packets.

In the preferred embodiment of the invention, however, the CS level switching processor 24 of the reception controller 2 changes the carrier sense level of the wireless communication section 3 to the sniff CS level, e.g. −85 dBm, in the sniff operation. Therefore, when the sniffing section 25 successively carries out the carrier sense, the node B can determine that the carrier exists and extend the sniff time so that the startup request packet is successfully received.

As described above, according to the preferred embodiment of the invention, the carrier sense level of the wireless communication section 3 can be switched to the transmission CS level when transmitting packets, or to the sniff CS level when sniffing. It is thus possible to detect a carrier by using a carrier sense level different from one for use in the CSMA system while sniffing. It is therefore possible to receive a startup request packet within a short sniff period of time so that high power-saving efficiency is attained while the sniff period of time is extended, thereby being able to prevent reception failure of startup request packets.

An alternative embodiment of the communication apparatus of the present invention will be described with reference to FIG. 4. The alternative embodiment is also applicable to a communication apparatus installed in communication nodes forming, for example, a sensor network.

The illustrative embodiment shown in and described with reference to FIG. 1 is directed to a static determination of the sniff CS level. The alternative embodiment is directed to a dynamic determination of the sniff CS level.

Figure 4:
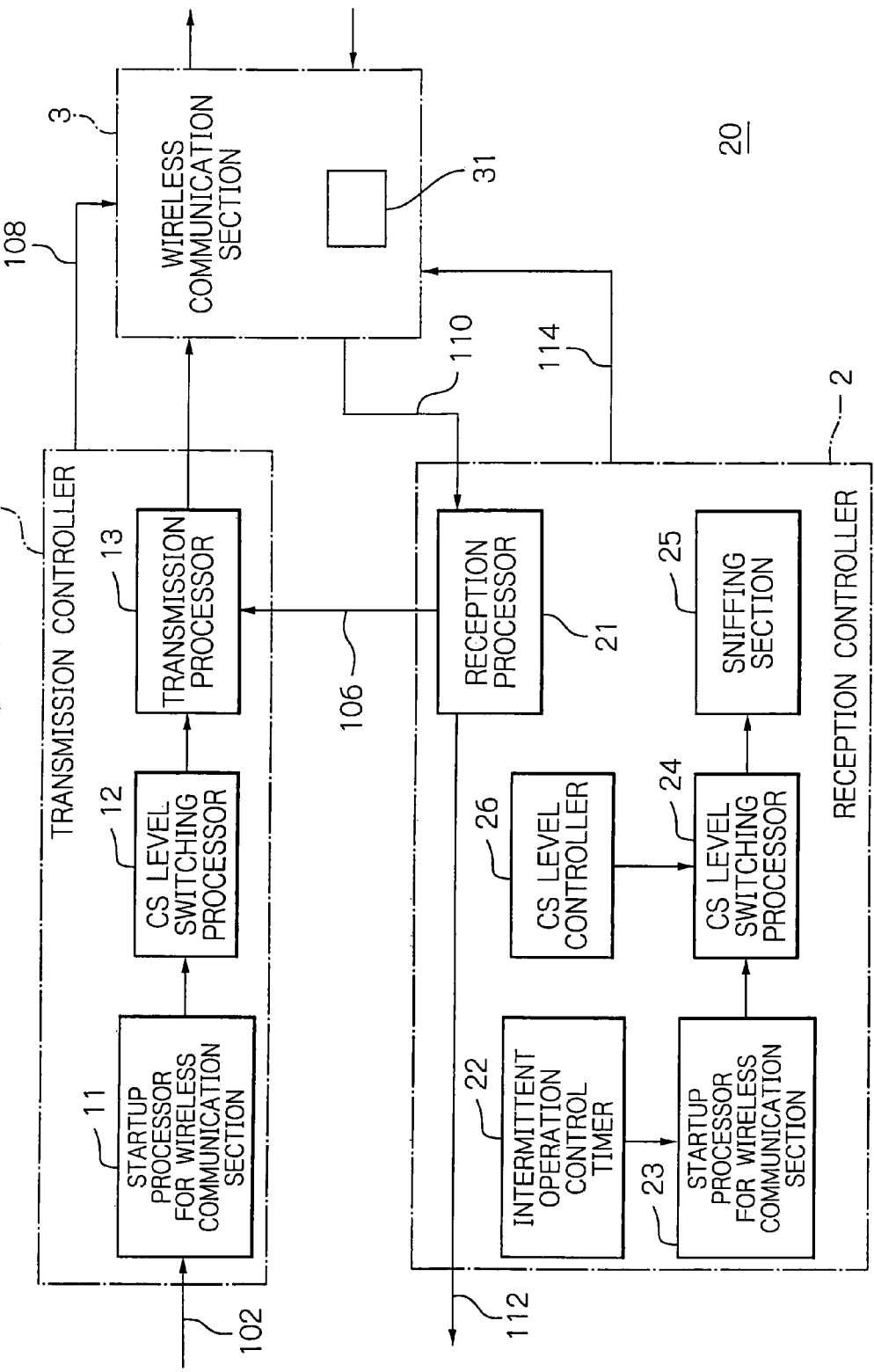
FIG. 4 is a schematic block diagram, like FIG. 1, showing the internal structure of an alternative embodiment of the communication apparatus in accordance with the present invention.

FIG. 4 is a schematic block diagram showing the internal configuration of the communication apparatus in a communication node 20 according to the alternative embodiment. As shown in the figure, the communication apparatus 20 according to the alternative embodiment includes the transmission controller 1, the reception controller 2 and the wireless communication section 3 which are the same as the illustrative embodiment shown in FIG. 1. Like components or elements are designated with the same reference numerals.

The reception controller 2 basically includes the reception processor 21, intermittent operation control timer 22, startup processor 23 for wireless communication section, CS level switching processor 24, sniffing section 25 and a CS level controller 26, which are interconnected as illustrated.

The communication apparatus 20 according to the alternative embodiment has the same configuration as the illustrative embodiment shown in FIG. 1 except the CS level controller 26 included in the reception controller 2. The CS sniff level controller 26 is adapted to be responsive to results from sniffing of the sniffing section 25 and packet reception of the reception processor 21 to adjust the carrier sense level to be switched by the CS level switching processor 24.

For example, the sniffing section 25 can extend the sniff period of time when determining that a startup request packet is partially received with high possibility, as described in respect of the illustrative embodiment shown in FIG. 1. Even in that case, the CS level controller 26 increases, if the reception processor 21 cannot receive a startup request packet, the sniff CS level.

The CS level controller 26 is thus provided because, when the sniff CS level is set too low, the wireless communication section 3 would otherwise react to noise so as to unnecessarily lengthen the sniff timing period even when no startup request packet has arrived. Therefore, by adjusting the level as described above, it is possible to avoid such an unnecessary extension of the sniff timing period.

Furthermore, for example, when the predetermined sniff timing period, corresponding to the predetermined number of sniffs, has lapsed, there sometimes occurs a case where the sniffing section 25 does not lengthen the sniff timing period at all or the reception processor 21 receives no startup request packets at all. In such cases, the CS level controller 26 adjusts the sniff CS level to decrease. With the illustrative embodiment shown in FIG. 1, the sniff CS level set too high causes no startup request packet to be detected. With the alternative embodiment, the adjustment is carried out as described above so as to avoid the difficulty.

The sniff CS level may be adjusted by the CS level controller 26 adapted to, for example, increase or decrease the sniff CS level by a predetermined value between upper and lower limits.

Next, operation of the communication apparatus 20 serving as a node according to the alternative embodiment will be described with reference to FIG. 4. As described before, the nodes A and B act as packet transmitter and receiver nodes, respectively. For simplicity in description, the initial value of the sniff CS level is set so low as to react to very weak radio waves, such as noise, in signal strength to erroneously detect it as a carrier.

Initially, at the node B, i.e. receive node, the wireless communication section 3 is controlled by the reception controller 2 to repeat intermittent startup operation.

The CS level controller 26 has now set the sniff CS level at low value, so that the carrier sense would be too sensitive to the extent that the reception processor 21 tends to determine that the startup request packet is partially received with high possibility.

For that reason, the sniffing section 25 extends the sniff timing period. However, since no startup request packet is actually transmitted yet, the reception processor 21 fails to receive any startup request packet.

In that condition, namely, when the CS level controller 26 recognizes that no startup request packet has received in spite of the sniff timing period extended, the controller 26 controls the sniff CS level to increment by a predetermined value.

After having controlled the sniff CS level, the CS level controller 26 repeats the sniffing, so that it is possible to prevent noise from causing the sniff timing period to be unnecessarily extended.

If the sniff CS level is set too high, it would be difficult to receive any startup request packet. Then, the CS level controller 26 decreases the sniff CS level to be optimized.

The CS level controller 26 controls the sniff CS level in that way to thereby adaptively optimize the sniff CS level during the operation without setting a suitable value in advance.

As described above, in the alternative embodiment, it is possible to dynamically or adaptively adjust the sniff CS level on the basis of the received signal strength of a startup request packet sent from the transmitter node. It is therefore unnecessary to set the sniff CS level in advance, so that the communication apparatus 20 can flexibly cope with node distribution on site and radio propagation environment.

As a result, in addition to the advantages attained by the illustrative embodiment shown in FIG. 1, the alternative embodiment can advantageously suppress the cost for suitably designing the sniff CS level and the possibility in failure of receiving a startup request packet.

The constituent components, such as the wireless communication section, transmission controller and reception controller, of the illustrative embodiments are depicted in FIGS. 1 and 4 in the form of functional blocks for the convenience of description. It is however not to be restrictively comprehended how to dispose those components in a telecommunications system. Other than specifically shown in and described with reference to FIGS. 1 and 4, for example, those components may be distributed in a telecommunications system so far as the idea of the invention is implemented.

The components of the communication apparatus of the illustrative embodiments may be implemented by means of software processing. For example, the components may be implemented on a CPU (Central Processor Unit), ROM (Read-Only Memory), RAM (Random-Access Memory) and EEPROM (Electrically Erasable and Programmable ROM), wherein the CPU uses data required for processing to carry out program sequences stored in the ROM, thereby performing the operations of the illustrative embodiments. Alternatively, the components may at least partially be implemented by means of hardware.

The entire disclosure of Japanese patent application No. 2008-143080 filed on May 30, 2008, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A communication apparatus that intermittently carries out a receiving operation during a predetermined reception period, comprising:

a wireless communication section for carrying out wireless communication, said wireless communication section including a carrier sensor for sensing a carrier at a beginning of the communication and a reception controller for controlling a reception process of said wireless communication section; and a carrier sense switching section setting in said carrier sensor a first carrier sense level for use in packet transmission and a second carrier sense level for use in packet reception and different from the first sense level, said carrier sense switching section selectively switching the carrier sense levels according to a transmitted or a received packet, wherein said carrier sensor senses said carrier by using the first carrier sense level when the packet is transmitted or by using the second carrier sense level when the packet is received;

wherein the first carrier sense level of the transmission is set to an optimum value for preventing collision in a carrier sense multiple access (CSMA) system and the second carrier sense level is set to a value lower than the first carrier for sniffing;

wherein the reception controller is responsive to a startup request packet received from a source node during said predetermined reception period after started up to control a startup response packet to be transmitted to the source node, and thereafter wait for reception of data from the source node, a transmission controller controlling the startup request packet to be successively transmitted when a data packet is to be transmitted to a destination node, said transmission controller being responsive to the startup response packet received from the destination node to transmit the data packet; and wherein, when the startup request packet fails to be entirely received within the predetermined reception period, said reception controller extends the predetermined reception period.

2. The apparatus in accordance with claim 1, further comprising the transmission controller for controlling a transmission process of said wireless communication section while transmitting data packets, said carrier sense switching section switching a carrier sense level to the first carrier sense level after said transmission controller has started up said wireless communication section.

3. The apparatus in accordance with claim 1, further comprising wherein said reception controller for controlling a reception process of said wireless communication section, said wireless communication section controlling a includes an intermittent operation controller that controls timing of intermittent operation, and said carrier sense switching section switching a carrier sense level to the second carrier sense level after said intermittent operation controller has started up said wireless communication section.

4. The apparatus in accordance with claim 3, wherein said reception controller further comprises a carrier sense level controller operative in response to a result of the packet reception in said reception controller for dynamically adjusting the second carrier sense level.

5. The apparatus in accordance with claim 4, wherein, when said carrier sensor carries out carrier sense in reception waiting within the predetermined reception period to determine that the carrier exists and said reception controller does not receive a packet yet, said carrier sense level controller adjusts the second carrier sense level to increase.

6. The apparatus in accordance with claim 5, wherein, when said carrier sensor determines that no carrier exists, the second carrier sense level is decreased.

7. The apparatus in accordance with claim 4, wherein, when said carrier sensor carries out carrier sense in reception waiting within the predetermined reception period to determine that no carrier exists, said carrier sense level controller adjusts the second carrier sense level to decrease.

8. The apparatus in accordance with claim 3, wherein, when the apparatus partially receives the startup request packet and determines that the carrier exists, said reception controller extends the predetermined reception period after start up.

9. A communication method in a communication apparatus that intermittently carries out a receiving operation during a predetermined reception period, the apparatus including a wireless communication section and a carrier sense switching section, the wireless communication section including a carrier sensor for sensing a carrier at a beginning of the communication and a reception controller for controlling a reception process, said method comprising: a wireless communication step of carrying out wireless communication by the wireless communication section; a carrier sense switching step of setting in the carrier sensor a first carrier sense level for use in packet transmission and a second carrier sense level for use in packet reception and that is different from the first sense level, and selectively switching the carrier sense levels according to a transmitted or a received packet; and a carrier sensing step of sensing said carrier with said carrier sensor by using the first carrier sense level when the packet is transmitted or by using the second carrier sense level when the packet is received; wherein the first carrier sense level of the transmission is set to optimum value for preventing collision in a carrier sense multiple access (CSMA) system and the second carrier sense level is set to a value lower that the first carrier for sniffing; wherein a carrier sense level of a sniffing is selected with a different level from a carrier sense level of a carrier sense multiple access system, by switching to a transmission carrier sense level in packet transmission, to sniff carrier sense levels, wherein the reception controller is responsive to a startup request packet received from a source node during said predetermined reception period after started up to control a startup response packet to be transmitted to the source node, and thereafter wait for reception of data from the source node, a transmission controller controlling the startup request packet to be successively transmitted when a data packet is to be transmitted to a destination node, said transmission controller being responsive to the startup response packet received from the destination node to transmit the data packet; and wherein, when the startup request packet fails to be entirely received within the predetermined reception period, said reception controller extends the predetermined reception period.

10. A communication apparatus that intermittently carries out a receiving operation during a predetermined reception period, the apparatus comprising: a wireless communication section including a carrier sensor configured to sense a carrier at a beginning of the communication for carrying out wireless communication and a reception controller for controlling a reception process of said wireless communication section; and a carrier sense switching section configured to set a first carrier sense level in the carrier sensor for use in packet transmission and a second carrier sense level for use in packet reception, the second carrier sense level being different from the first carrier sense level, wherein the carrier sense switching section is configured to selectively switch the first and second carrier sense levels according to a transmitted or a received packet, wherein the first carrier sense level of the transmission is set to an optimum value for preventing collision in a carrier sense multiple access (CSMA) system and the second carrier sense level is set to a value lower than the first carrier for sniffing;

wherein the reception controller is responsive to a startup request packet received from a source node during said predetermined reception period after started up to control a startup response packet to be transmitted to the source node, and thereafter wait for reception of data from the source node, a transmission controller controlling the startup request packet to be successively transmitted when a data packet is to be transmitted to a destination node, said transmission controller being responsive to the startup response packet received from the destination node to transmit the data packet; and wherein, when the startup request packet fails to be entirely received within the predetermined reception period, said reception controller extends the predetermined reception period.

11. A communication apparatus that intermittently carries out a receiving operation during a predetermined reception period, comprising: a wireless communication section for carrying out wireless communication, said wireless communication section including a carrier sensor for sensing a carrier at a beginning of the communication; and a carrier sense switching section setting in said carrier sensor a first carrier sense level for use in packet transmission and a second carrier sense level for use in packet reception and different from the first sense level, said carrier sense switching section selectively switching the carrier sense levels according to a transmitted or a received packet, wherein said carrier sensor senses said carrier by using the first carrier sense level when the packet is transmitted or by using the second carrier sense level when the packet is received; wherein the communication apparatus further comprises a reception controller for controlling a reception process of said wireless communication section, said wireless communication section controlling a timing of intermittent operation, said carrier sense switching section switching a carrier sense level to the second carrier sense level after said intermittent operation controller has started up said wireless communication section, wherein said reception controller is responsive to a startup request packet received from a source node during said predetermined reception period after started up to control a startup response packet to be transmitted to the source node, and thereafter wait for reception of data from the source node, a transmission controller controlling the startup request packet to be successively transmitted when a data packet is to be transmitted to a destination node, said transmission controller being responsive to the startup response packet received from the destination node to transmit the data packet, and wherein, when the startup request packet fails to be entirely received within the predetermined reception period, said reception controller extends the predetermined reception period.

* * * * *